United States Patent
Kumm

(10) Patent No.: US 10,224,701 B2
(45) Date of Patent: Mar. 5, 2019

(54) MODULAR STRUCTURAL AND ELECTRICAL BUILDING SYSTEM

(71) Applicant: BLUESCOPE BUILDINGS NORTH AMERICA, INC., Kansas City, MO (US)

(72) Inventor: Daniel Mark Kumm, Kansas City, MO (US)

(73) Assignee: Bluescope Buildings North America, Inc., Kansas City, MO (US)

( * ) Notice: Subject to any disclaimer, the term of this patent is extended or adjusted under 35 U.S.C. 154(b) by 0 days.

(21) Appl. No.: 15/968,338

(22) Filed: May 1, 2018

(65) Prior Publication Data

US 2018/0316170 A1    Nov. 1, 2018

Related U.S. Application Data

(60) Provisional application No. 62/492,523, filed on May 1, 2017.

(51) Int. Cl.
*H02G 3/38* (2006.01)
*E04B 7/00* (2006.01)
(Continued)

(52) U.S. Cl.
CPC ............... *H02G 3/386* (2013.01); *E04B 7/00* (2013.01); *E04C 3/04* (2013.01); *E04D 13/00* (2013.01)

(58) Field of Classification Search
CPC .. H02G 3/386; E04C 3/04; E04B 7/00; E04D 13/00
See application file for complete search history.

(56) References Cited

U.S. PATENT DOCUMENTS 2,306,685 A * 12/1942 Chambers ............... E04B 9/001
  181/293
2,313,687 A * 3/1943 Schramm .................. E04B 9/32
  362/150
(Continued)

FOREIGN PATENT DOCUMENTS

CA    2125641 A1    12/1995
CA    2707386 A1 * 12/2010 ........... H01R 25/142
(Continued)

OTHER PUBLICATIONS

Conductix Wampfler, Delachaux Group, Multipole Conductor Rail 831 Series Multiline.

*Primary Examiner* — Jeanette E Chapman
(74) *Attorney, Agent, or Firm* — Lathrop Gage L.L.P.

(57) ABSTRACT

Disclosed herein is a modular structural and electrical building system. The system includes first and second structural support members. In use, the second end of the first structural support member is adjacent the first end of the second structural support member. The system further includes at least one conductor bar secured to each of the structural members. In addition, the system utilizes conductor bar connectors for maintaining electrical connectivity from one conductor bar to the next on the same structural support member and a power drop connector for connecting electrical power carried by the conductor bar to various pieces of equipment. In addition, a jump cable provides a bridge for electrical power from the conductor bar on the first structural member to the conductor bar secured to an adjacent structural member.

20 Claims, 8 Drawing Sheets

(51) Int. Cl.
*E04D 13/00* (2006.01)
*E04C 3/04* (2006.01)

(56) References Cited

U.S. PATENT DOCUMENTS

| | | | | |
|---|---|---|---|---|
| 2,680,502 | A | * | 6/1954 | Kenneth Kurtzon Charles .......... E04B 9/345 362/355 |
| 2,700,798 | A | * | 2/1955 | Adelar Perrottet ....... E04H 3/22 52/10 |
| 2,884,614 | A | * | 4/1959 | Taylor ..................... H01R 4/38 191/33 R |
| 2,913,818 | A | * | 11/1959 | Somes, Jr. ............... H02G 5/06 29/241 |
| 2,931,097 | A | * | 4/1960 | Somes, Jr. ............... H02G 5/06 174/40 R |
| 2,953,626 | A | * | 9/1960 | Somes, Jr. ............... H02G 5/06 174/99 B |
| 2,969,438 | A | * | 1/1961 | Herrmann John A ... H02G 5/04 104/111 |
| 2,975,512 | A | * | 3/1961 | Somes, Jr. ............... H02G 5/04 174/99 R |
| 3,007,996 | A | * | 11/1961 | Somes, Jr. ............... H02G 5/06 174/40 R |
| 3,512,313 | A | * | 5/1970 | Harz ........................ E04B 9/12 362/150 |
| 3,675,006 | A | * | 7/1972 | Zagel ....................... F21V 3/00 211/26 |
| 3,683,101 | A | * | 8/1972 | Liberman ............. E04B 2/7453 174/491 |
| 3,707,205 | A | | 12/1972 | Gibson |
| 3,717,334 | A | | 2/1973 | Kahabka et al. |
| 3,936,023 | A | * | 2/1976 | Clifton .................... F21V 21/34 248/228.5 |
| 3,989,579 | A | * | 11/1976 | Sheldon .................. B29C 53/06 156/443 |
| 4,083,153 | A | * | 4/1978 | Sumpter .................. E04B 9/00 52/22 |
| 4,126,971 | A | * | 11/1978 | Macuga .................. E04B 9/006 248/214 |
| 4,146,287 | A | * | 3/1979 | Jonsson .................. H02G 3/00 439/368 |
| 4,164,011 | A | * | 8/1979 | Sherwood ............... F21S 8/02 362/148 |
| 4,219,869 | A | * | 8/1980 | Bowman .................. F21S 8/06 362/147 |
| 4,365,449 | A | * | 12/1982 | Liautaud ................. E04B 9/32 362/217.15 |
| 4,554,766 | A | * | 11/1985 | Ziemer .................... E04B 9/02 454/187 |
| 4,685,255 | A | | 8/1987 | Kelley |
| 4,800,696 | A | | 1/1989 | Miller et al. |
| 4,837,665 | A | * | 6/1989 | Hoyer ................... H05B 37/029 362/233 |
| 4,866,583 | A | * | 9/1989 | Targetti ..................... F21S 2/00 362/404 |
| 4,912,889 | A | * | 4/1990 | Palumbo ................. E04B 1/19 362/145 |
| 5,107,637 | A | * | 4/1992 | Robbins ................ E04H 1/1211 136/291 |
| 5,794,397 | A | * | 8/1998 | Ludwig .................. E04B 9/006 52/28 |
| 6,026,626 | A | * | 2/2000 | Fisher ....................... E04C 3/08 52/28 |
| 6,058,635 | A | | 5/2000 | Morris |
| 6,224,433 | B1 | * | 5/2001 | Chadbourne .......... H01R 4/186 174/71 R |
| 6,357,555 | B1 | | 3/2002 | Koza et al. |
| 7,481,550 | B1 | * | 1/2009 | Schreiber ................. E04B 9/32 362/148 |
| 7,728,460 | B2 | * | 6/2010 | Rowe ..................... F21V 15/013 307/147 |
| 8,496,492 | B2 | * | 7/2013 | Byrne ..................... H02G 3/386 439/210 |
| 8,616,501 | B2 | | 12/2013 | Brownjohn et al. |
| 8,713,893 | B2 | | 5/2014 | Van Randen |
| 9,022,407 | B2 | | 5/2015 | Senechal |
| 9,169,646 | B2 | * | 10/2015 | Rodrigues ............... E04D 13/00 |
| 9,373,943 | B1 | | 6/2016 | Tannenbaum |
| 9,441,357 | B1 | | 9/2016 | Vafaee |
| 9,441,371 | B1 | * | 9/2016 | Harkins ................... E04C 3/02 |
| 9,455,561 | B2 | * | 9/2016 | Welch .................. H01R 25/162 |
| 2002/0100235 | A1 | | 8/2002 | Weiss |
| 2009/0113813 | A1 | * | 5/2009 | Weber ................. H02G 3/0493 52/28 |
| 2009/0320389 | A1 | * | 12/2009 | White ............... H01L 31/02008 52/173.3 |
| 2017/0096823 | A1 | * | 4/2017 | Apostolopoulos ...... E01D 22/00 |

FOREIGN PATENT DOCUMENTS

| | | | | |
|---|---|---|---|---|
| CA | 2853082 | A1 | * 11/2014 | ............ H02G 3/105 |
| DE | 3336001 | A1 | * 4/1985 | ............ E04D 13/00 |
| EP | 1724898 | A1 | 11/2006 | |
| FR | 2500515 | A1 | * 8/1982 | ............ E04B 1/342 |
| GB | 845278 | A | * 8/1960 | .............. H02G 5/04 |
| GB | 2470977 | A | 12/2010 | |

\* cited by examiner

MODULAR STRUCTURAL AND ELECTRICAL BUILDING SYSTEM

RELATED APPLICATIONS

This application claims the benefit of priority of U.S. Application No. 62/492,523 filed on May 1, 2017.

TECHNICAL FIELD

This disclosure relates to a pre-wired building system to be delivered to the jobsite as a combined structural and electrical building component.

BACKGROUND

Buildings consisting of structural members such as truss purlins cannot presently claim optimal cost effectiveness in the installation of electrical wiring systems. Currently electricians can spend considerable time and effort on the installation of traditional conduit and wiring for electrical distribution systems located at the roof level in buildings. Installation of these systems creates a safety hazard for personnel since work must proceed near roof levels and typically in a man-lift thereby increasing the potential for a fall from the man-lift. Other trades, such as those doing concrete flatwork, for example, may not be able to proceed with their activities until power for lighting is available within the building thereby unnecessarily extending the time for project completion.

SUMMARY

In order to maximize efficiency and to enhance the overall safety of the construction of buildings, disclosed herein is a system integrating the fabrication of the structural and certain electrical aspects of the building roof trusses. The disclosed system overcomes the existing deficiencies and inefficiencies associated with the installation of the electrical system by electricians following installation of the roof structural members.

A preferred embodiment of the disclosed system includes at least one structural member with first and second longitudinally opposed ends and a plurality of web members spanning between a lower chord and an upper chord. The disclosed system further includes a plurality of connected in series conductor bars traversing and secured to the longitudinally extending structural members. The conductor bars are defined expansively to include various configurations of conducting systems to include rigidly constructed rails, pre-manufactured modular wiring systems and insulated wire in metallic or plastic conduit. The conductor bars are connected to one another by at least one conductor bar-to-conductor bar connector for electrically connecting the first end of the conductor bar to the second end of an adjacent conductor bar or by utilizing a jump cable when there exists the need to span power between structural members that may be separated by an I-beam or other obstruction.

Various objects, features, aspects and advantages of the disclosed subject matter will become more apparent from the following detailed description of preferred embodiments, along with the accompanying drawings in which like numerals represent like components. The contents of this summary section are provided only as a simplified introduction to the disclosure, and are not intended to be used to limit the scope of the appended claims.

DEFINITIONS

Conductor bar—is defined as an electrical conductor which may be wire or other shaped conducting material that may be installed in a wide range of configurations to include electrical conduit and conductor elements that may be either rigid or flexible in configuration as the demands of the application dictate.

DETAILED DESCRIPTION

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended claims.

Prefabrication is the practice of assembling components of a structure in a factory or other manufacturing site, and transporting complete assemblies or sub-assemblies to the construction site where the structure is to be located. The term is used to distinguish this process from the more conventional construction practice of transporting the basic materials to the construction site where all assembly is carried out.

Figure 1:
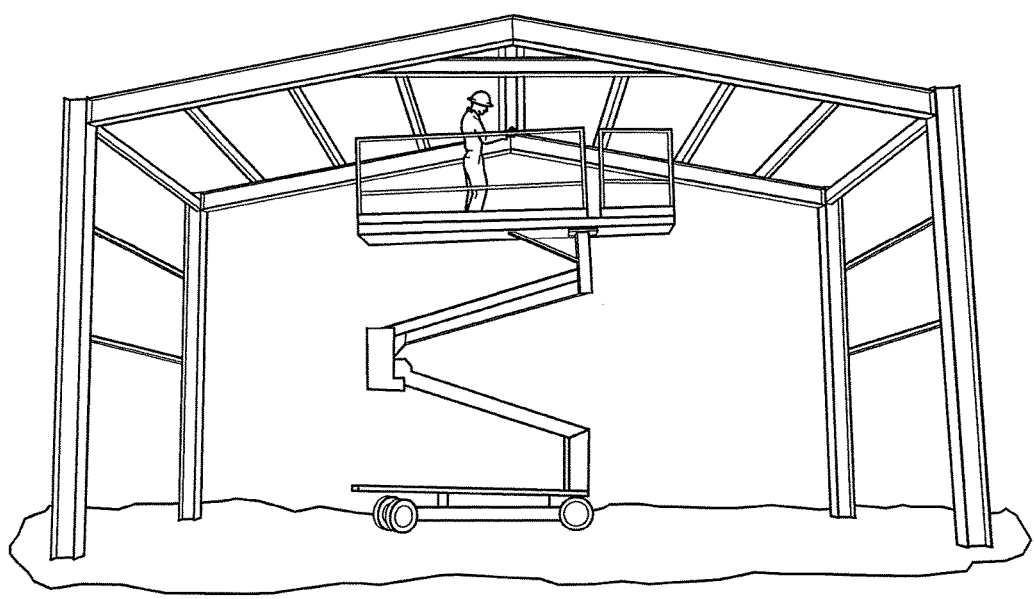
FIG. 1 depicts electricians in a man-lift wiring a structural member of a building without the system disclosed herein.

The theory behind the method is that time and cost is saved if similar construction tasks can be grouped, and assembly line techniques can be employed in prefabrication at a location where skilled labor is available, while congestion at the construction site, which wastes time, can be reduced. The method finds application particularly where the structure is composed of repeating units or forms, or where multiple copies of the same basic structure are being constructed. Prefabrication avoids the need to transport so many skilled workers to the construction site, and other restricting conditions such as a lack of power, lack of water, exposure to harsh weather or a hazardous environment are avoided. The need to lift electricians to near roof height with a man-lift, as shown in FIG. 1, is avoided when the system disclosed herein is employed. Against these advantages is weighed the cost of the transportation of the prefabricated sections and lifting them into position as they are only slightly heavier, somewhat more fragile and potentially nominally more difficult to handle than the structural member without the electrification system integration.

Figure 2:
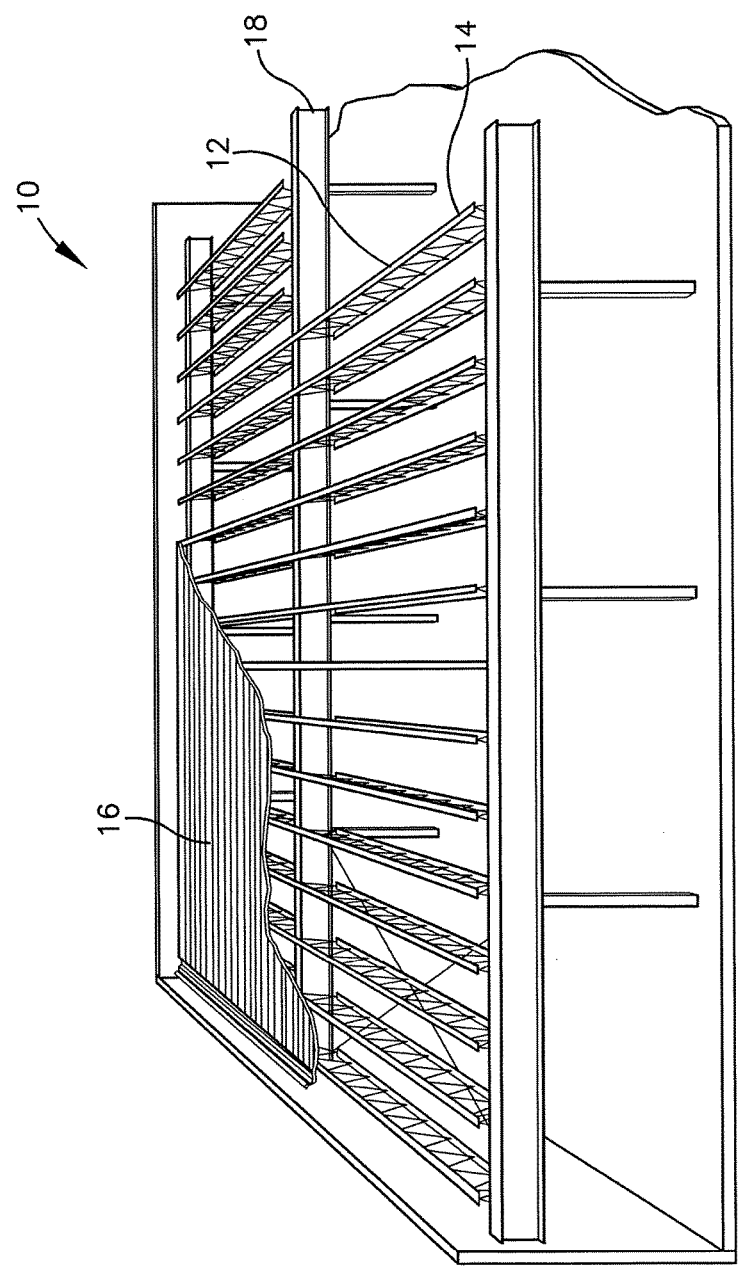
FIG. 2 depicts the structural features of a partially constructed building.

FIG. 2 details a partially constructed pre-engineered building. Shown in FIG. 2 are the pre-wired building structural member system 10 comprised of structural members 12 and the associated electrical components 14. In addition, FIG. 2 details the roof system 16 and the roof beam 18 for supporting the pre-wired truss purlins. In steel construction, the terms joist, truss, purlins and truss purlin typically refers to roof framing members that span parallel to or perpendicular to the building edge, and support the roof decking or sheeting. Truss purlins are in turn supported by roof beams. Structural members 12 such as truss purlins are commonly used in building systems and support the weight of the building's roof deck—the material used for the roof itself. The truss purlins also make the entire roof structure more rigid.

Figure 3:
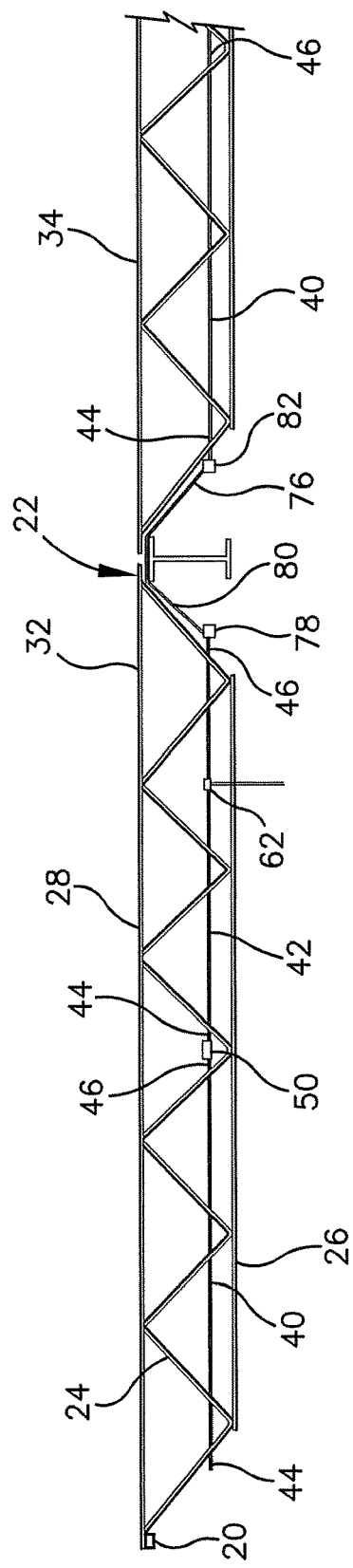
FIG. 3 illustrates two adjacent structural members with the pre-fabricated electrical power distribution system disclosed herein.

Structural members 12, as shown in FIG. 3, are a preferred embodiment of the modular structural building component and generally comprise first and second longitudinally opposed ends 20, 22 along with a plurality of web members 24 spanning between a lower chord 26 and an upper chord 28. In a building configuration, a second end 22 of a first structural support member 32 is positioned adjacent the first end 20 of a second structural support member 34. These structural members 32, 34 also preferably include at least one longitudinally extending conductor bar 40 secured to each of the structural members 32, 34. The conductor bar 40 includes first and second longitudinally opposed ends 44, 46. The conductor bar 40 first end 44 is connected to the electrical power feed coming into the building. Depending upon the span of the structural members 32, 34 and the span of the conductor bar 40, a second conductor bar 42 may be connected to the first conductor bar with a conductor bar-to-conductor bar connector 50 for maintaining electrical connectivity from the second end 46 of the first conductor bar to a first end 44 of an adjacent conductor bar.

FIG. 3 also reveals a flexible jump cable 76 capable of connecting to the second end 46 of the first conductor bar 40 with an end connector 78 and with standard power cabling 80 traversing over the I-beam terminating in a connector 82 configured for connecting with the first end 44 of the second conductor bar 42. The jump cable connectors 78, 82 may be comparable in design to the conductor bar-to-conductor bar connector 50 utilized to electrically connect conductor bars 40, 42 that are individually insufficient in length to span the entire structural member 12.

Figure 4:
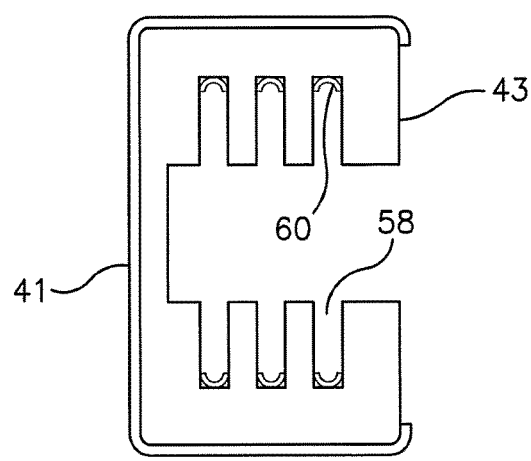
FIG. 4 depicts a cross-sectional view of an embodiment of a conductor bar.

FIG. 4 reveals a cross-sectional view of an embodiment of a conductor bar 40. This embodiment of a the conductor bar includes a protective metal covering 41 and a conductor bar casing 43 that retains that conductor bar channels 58 in position. Secured within the conductor bar channels 58 are metallic conductors 60 that facilitate the flow of electrical current along the conductor bar spanning the entire length of the building. It is these conductor bar channels 58 and metallic conductors 60 that provide the needed electrical power at any point along the entire span of the conductor bar. The specific design of the conductor bar 40 is less critical than the ease with which the connection to the conductor bar is made by the device requiring electrification, such as the plug of a fan or a welding unit. Variously shaped adapters (not shown) may be required to connect the plug of a standard item of equipment to the conductor bar 40 in order to gain access to the electrical current, and those adapters are well known in the industry. The adapters themselves contain female structure for insertion of the standard plug of the equipment requiring electrification and these adapters are also configured for insertion into the conductor bar thereby completing the circuit for current flow.

Figure 5A:
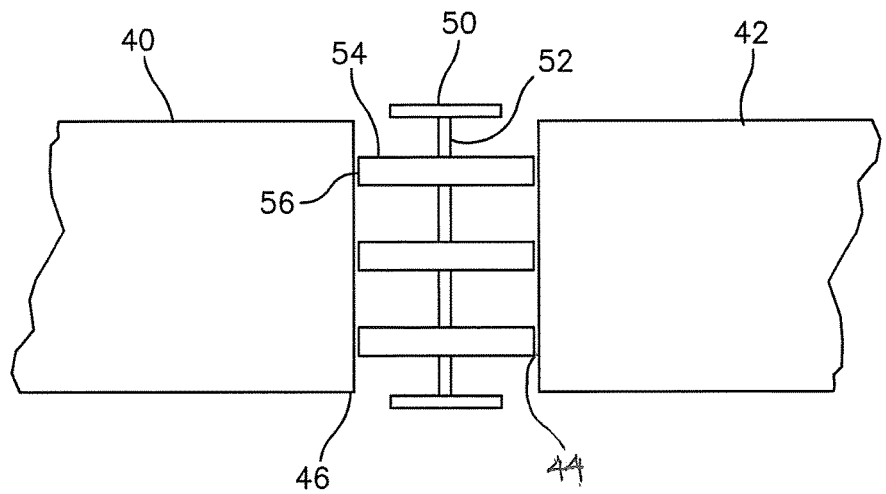
FIG. 5A depicts an embodiment of a conductor bar-to-conductor bar connector prior to insertion into the opposite ends of adjacent conductor bars.
Figure 5B:
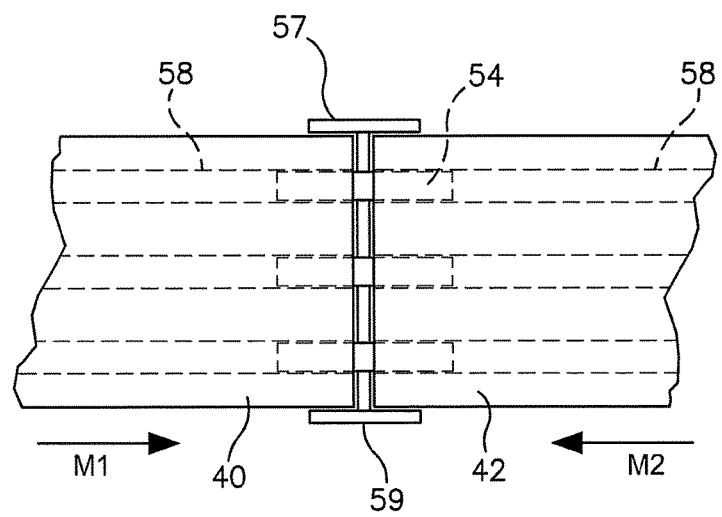
FIG. 5B depicts the conductor bar-to-conductor bar connector after insertion into opposite ends of adjacent conductor bars with phantom lines detailing the location of the continuity plugs and the channels.

An exemplary embodiment of a conductor bar-to-conductor bar connector 50 is shown in FIGS. 5A and 5B. The exemplary embodiment of the conductor bar-to-conductor bar connector 50 facilitates the electrical connectivity between the adjacent conductor bars 40, 42 by sliding over the second end 46 of the first conductor bar 40 wherein a hard stop surface 52 of the connector 50 interferes with the second end 46 of the conductor bar 40. Protruding from the connector 50 are at least two, and preferably as many as five, electrical continuity plugs 54 that are manually inserted into female receptacle areas 56 at the ends 44 of the adjacent conductor bar 42 channels 58. Extending outwardly from the female receptacles 56 the conductor bar channels 58 extend the entire length of the conductor bars 40, 42 provide robust electrification opportunities. The channels 58 are each at least partially lined with a conductive material 60 along their entire length. FIG. 5A reveals the connector 50 continuity plugs 54 ready for insertion into the female receptacle areas 56 while FIG. 5B details a cross sectional view of the completed insertion of the continuity plugs 54 all the way into the female receptacle areas 56. The direction of motion of conductor 40 bar is shown at M1 and the direction of motion of conductor bar 42 is as shown at M2. In addition, phantom lines are shown that detail the placement of the continuity plugs 54 in position within the receptacle area 56 as well as the longitudinally extending channels 58. The upper and lower flanges 57, 59 provide a friction fit between the two conductor bars 40, 42 facilitating a tight, vibration resistant fit between the conductor bars 40, 42.

The lining of conductive material 60 facilitates the transfer of electrical current to the power drop connector 62, shown on FIG. 3, which can be inserted into the conductor bars 40, 42 in order to energize, for example, lighting, motors, welding systems. Because the conductor bar channels 58 and the conductive lining material 60 are continuous along the entire length and are only nominally interrupted at the connector 50, the power drop connector 62 can be connected at an infinite number of locations along the length of the conductor bar 40, 42 thereby enhancing the operational flexibility of the modular system 10.

Figure 6:
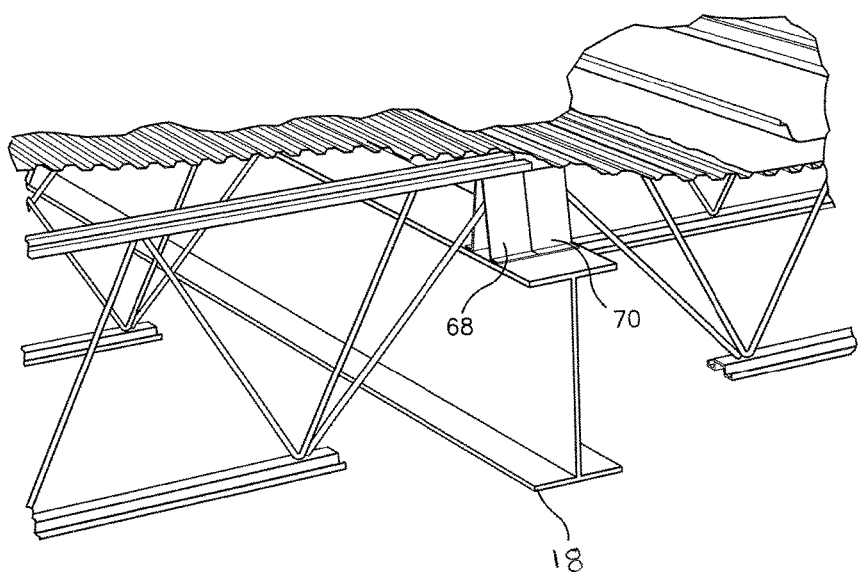
FIG. 6 depicts structural members with conductor bar embodiments applied to each and a jump cable embodiment spanning an I-beam.

As seen in FIG. 6, structural members 12, such as truss purlins, typically span large distances and terminate at bearing blocks 68, 70 which rest upon a structural I-beam 18. The I-beam 18 creates a barrier obstructing the path of the conductor bar 40, 42 from one structural member to the next, so a feature developed to address the open span discontinuity is a jump cable 76. Various embodiments of jump cables are contemplated with this disclosure and the cable configuration discussed herein should not be considered limiting in any respect.

Figure 7:
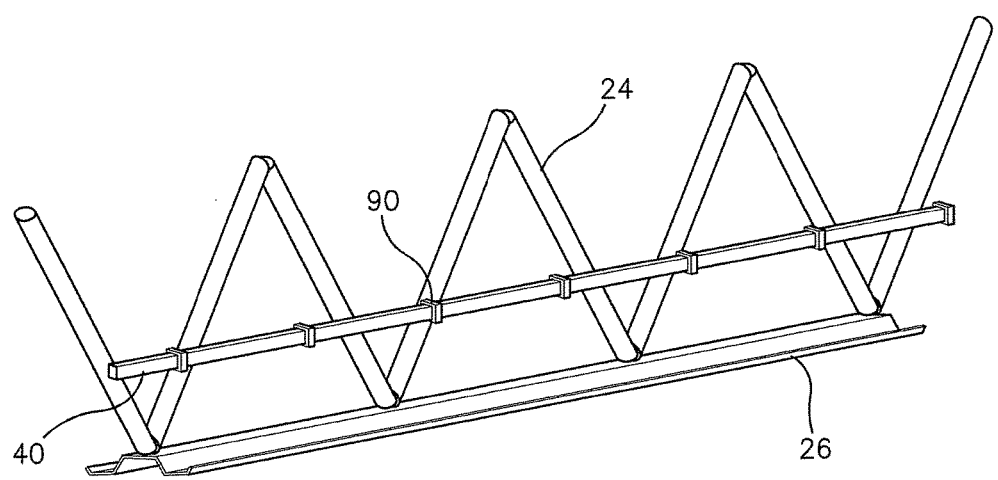
FIG. 7 depicts a structural member with an embodiment of a conductor bar secured thereto.
Figure 8:
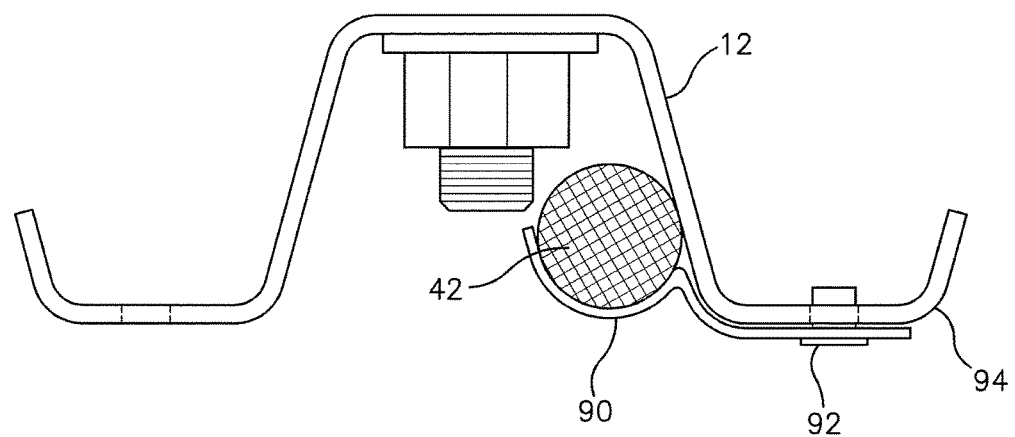
FIG. 8 depicts a structural member with an embodiment of a conductor bar secured thereto.

As seen in FIG. 7, conductor bars 40, 42 are preferably secured to the web members 24 just above the lower chord 26. Various means for attaching the conductor bars 40, 42 to the structural members 12 include metal banding, plastic cinch ties or even specially designed brackets 90 may be employed to accomplish securing the conductor bars to the truss purlins. FIG. 8 reveals an exemplary embodiment of the disclosed technology wherein a cross sectional view of a longitudinally extending structural member 12 and a conductor bar 42 are mounted within a tray 90 or alternatively a clip mechanism 91, the tray in-turn is secured with an attachment means 92 to a lower flange 94 of the structural member 12.

In operation, the truss purlins 32, 34 with conductor bars 40, 42 are erected into position within the pre-engineered framework. As the need for lighting or to energize motors such as with fans, welders, air compressors, pumps or other equipment arises the user connects the power chord from the component requiring power into a chord (not shown) attached to the power drop connector 62 which can be inserted into the conductor bars 40, 42 in order to energize whatever is in need of power. Lighting systems, for example, can be hung from the truss purlins 32, 34 anywhere along the conductor bars 40, 42 except for the short spans of the conductor bar-to-conductor bar connector 50 and the region of the jump cables 76 which span the I-beam 18. Otherwise, the user simply manually inserts the drop connector 62 into the conductor bar in order to complete the electrical circuit and provide power as needed. When the need for power has ceased, the user simply extracts the drop connector 62 from the conductor bar. The insertion or removal of the drop connector 62 from the conductor bar does not interrupt the flow of power to any other components being energized by the conductor bar.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometries, materials, dimensions, ratios, steps, and the like discussed above are illustrative and are not required. Accordingly, the scope of the present invention should be considered in terms of the following claims and is understood not to be limited to the details of structure and operation shown and described in the specification and drawings. Moreover, the order of the components detailed in the system may be modified without limiting the scope of the disclosure.

I claim:

1. A pre-wired building structural member system comprising:
    at least one roof structural member with first and second longitudinally opposed ends;
    a plurality of serially aligned conductor bars longitudinally traversing and secured to the roof structural member, the conductor bars further comprising first and second longitudinally disposed ends;
    at least one conductor bar-to-conductor bar connector for electrically connecting the first end of the conductor bar to the second end of an adjacent conductor bar; and
    at least one power drop connector for withdrawing electrical power from the serially aligned conductor bars, wherein in a use configuration, the power drop connector is configured for engagement at any location along an entire span of the plurality of conductor bars.

2. The pre-wired building structural member system of claim 1, wherein the first and second ends of the roof structural member are configured as bearing blocks.

3. The pre-wired building structural member system of claim 2, wherein the bearing blocks are supported by a roof beam.

4. The pre-wired building structural member system of claim 3, wherein the roof beam supports the first end of a first roof structural member and the second end of an adjacent roof structural member.

5. The pre-wired building structural member system of claim 4, wherein a jump cable connects the conductor bar on the first structural member to the conductor bar on the second structural member.

6. The pre-wired building structural member system of claim 1, wherein the at least one power drop connector is configured for connection to the conductor bar.

7. The pre-wired building structural member system of claim 1, wherein the conductor bar is a single pole insulated conductor rail.

8. A modularly electrified building structural member system, the system comprising:
    a first and second structural support member, each support member further comprising first and second longitudinally opposed ends, the second end of the first structural support member adjacent the first end of the second structural support member;
    at least one conductor bar longitudinally traversing at least a portion of and secured to each of the structural members, the conductor bar further comprising first and second longitudinally opposed ends;
    at least one conductor bar-to-conductor bar connector for electrically connecting the first end of the conductor bar to the second end of an adjacent conductor bar;
    at least one power drop connector for expeditiously connecting a device power cord to the electrical power carried by the conductor bar, wherein the power drop connector is configured for engagement along the entire span of the at least one conductor bar longitudinally traversing and secured to each of the structural members; wherein
    a jump cable for delivering electrical power from the conductor bar traversing and secured to the first structural member to the conductor bar traversing and secured to the second structural member, the conductor bars further comprising first and second longitudinally disposed ends.

9. The modularly electrified building structural member system of claim 8, wherein the first and second longitudinally opposed ends of the structural member are configured as bearing blocks.

10. The modularly electrified building structural member system of claim 9, wherein the bearing blocks are supported by an I-beam.

11. The modularly electrified building structural member system of claim 10, wherein the I-beam supports the first end of a first structural member and the second end of an adjacent structural member.

12. The modularly electrified building structural member system of claim 8, wherein the device is selected from the group consisting of lighting, a fan, a space heater and a crane.

13. The modularly electrified building structural member system of claim 8, wherein the at least one power drop connector is configured for manual insertion and extraction from the conductor bar.

14. The modularly electrified building structural member system of claim 8, wherein the first and second structural support members are selected from the group consisting of joists, trusses, truss purlins, bar joists and girders.

15. A modular structural and electrical building system, the system comprising:
    a first and second structural support member each support member further comprising first and second longitudinally opposed ends and a plurality of web members spanning between a lower chord and an upper chord, the second end of the first structural support member proximate the first end of the second structural support member;

at least one longitudinally extending conductor bar secured to each of the structural members, the conductor bars further comprising first and second longitudinally opposed ends;

at least one conductor bar-to-conductor bar connector for maintaining electrical connectivity from the second end of the conductor bar to the first end of an adjacent conductor bar;

at least one power drop connector for connecting a power chord from a device to the electrical power carried by the conductor bar, wherein the power drop connector is configured for engagement anywhere along the span of the at least one conductor bar longitudinally traversing and secured to each of the structural members; and a jump cable configured to deliver electrical power from the conductor bar traversing and secured to the first structural member to the conductor bar traversing and secured to the second structural member, the jump cable further comprising first and second longitudinally disposed ends.

16. The modular structural and electrical building system of claim 15, wherein the at least one power drop connector is configured for manual insertion and extraction from the conductor bar.

17. The modular structural and electrical building system of claim 15, wherein the conductor bar further comprises at least two longitudinally extending channels, each channel at least partially lined with electrically conductive material and configured for receiving the power drop connector.

18. The modular structural and electrical building system of claim 15, wherein the conductor bar is selected from the group consisting of a single pole insulated conductor rail, a multi-pole conductor rail, a multi-pole enclosed conductor rail and conduit.

19. The modular structural and electrical building system of claim 15, wherein the engaged power drop connector is manually repositionable along the span of the least one conductor bar.

20. The modular structural and electrical building system of claim 15, wherein the engaged power drop connector is manually fixedly secured at a specified location along the span of the least one conductor bar.

* * * * *